(12) United States Patent
Holler et al.

(10) Patent No.: US 8,535,420 B2
(45) Date of Patent: Sep. 17, 2013

(54) FILTER DEVICE FOR SEPARATING PAINT OVERSPRAY

(75) Inventors: Sebastian Holler, Stuttgart (DE); Jens Holzheimer, Tamm (DE); Christof Knusel, Munich (DE); Marius Winkler, Freiberg/Neckar (DE)

(73) Assignee: Dürr Systems GmbH, Bietigheim-Bissingen (DE)

( * ) Notice: Subject to any disclaimer, the term of this patent is extended or adjusted under 35 U.S.C. 154(b) by 0 days.

(21) Appl. No.: 13/524,935

(22) Filed: Jun. 15, 2012

(65) Prior Publication Data

US 2012/0285323 A1    Nov. 15, 2012

Related U.S. Application Data

(63) Continuation of application No. PCT/EP2010/069483, filed on Dec. 13, 2010.

(30) Foreign Application Priority Data

Dec. 22, 2009 (DE) .......................... 10 2009 055 192

(51) Int. Cl.
*B01D 46/00* (2006.01)
*B05B 15/12* (2006.01)

(52) U.S. Cl.
USPC ......... 95/273; 55/385.2; 55/418; 55/DIG. 46; 118/309; 118/326; 118/61

(58) Field of Classification Search
USPC ................. 55/301, 385.2, 430, 432, 466, 524, 55/DIG. 46; 95/278, 285, 286; 96/372, 373; 118/309, 326; 427/300; 454/50, 53, 55, 454/187

See application file for complete search history.

(56) References Cited

U.S. PATENT DOCUMENTS

| 8,241,406 B2 * | 8/2012 | Weschke ......................... 95/278 |
| 2010/0199912 A1 * | 8/2010 | Holzheimer et al. ......... 118/326 |
| 2012/0266812 A1 * | 10/2012 | Iwakiri .......................... 118/326 |

FOREIGN PATENT DOCUMENTS

| CA | 2 697 442 A1 | 3/2009 |
| DE | 42 11 465 A1 | 10/1993 |
| DE | 10 2007 040901 A1 | 2/2009 |
| JP | 50-139138 A * | 6/1975 |

OTHER PUBLICATIONS

European Patent Office, International Search Report in International Patent Application No. PCT/EP2010/069483 (Mar. 28, 2011).

* cited by examiner

*Primary Examiner* — Duane Smith
*Assistant Examiner* — Minh-Chau Pham
(74) *Attorney, Agent, or Firm* — Leydig, Voit & Mayer, Ltd.

(57) ABSTRACT

To provide a filter device for separating paint overspray from a raw gas flow containing overspray particles, including a casing, which delimits an interior of the filter device, in which at least one filter element is arranged, and at least one inlet channel, through which the raw gas flow enters the interior of the filter device, in which the raw gas flow is stabilized by the inlet channel even with high flow speeds in the constriction of the inlet channel, it is proposed that the filter device has an intake channel, which runs into the inlet channel upstream of an end of the inlet channel on the interior side and connects the inlet channel to the interior of the filter device.

15 Claims, 7 Drawing Sheets

FIG. 7

FILTER DEVICE FOR SEPARATING PAINT OVERSPRAY

RELATED APPLICATION

This application is a continuation application of PCT/EP2010/069483 filed on Dec. 13, 2010 the entire specification of which is incorporated herein by reference.

FIELD OF DISCLOSURE

The present invention relates to a filter device for separating paint overspray from a raw gas flow containing overspray particles, wherein the filter device comprises a casing, which delimits an interior of the filter device, in which at least one filter element is arranged, and at least one inlet channel, through which the raw gas flow enters the interior of the filter device.

BACKGROUND

Such a device is known, for example, from patent document DE 10 2007 040 901 A1.

In this known filter device the inlet channel is delimited to the top by a baffle plate that is relatively short in the flow direction. In addition, a lower boundary surface of the inlet channel has a lesser inclination relative to the horizontal than a side wall of a funnel-shaped auxiliary material receiving tank connecting downwards to the inlet channel.

SUMMARY OF THE INVENTION

The object forming the basis of the present invention is to provide a filter device of the aforementioned type, in which the raw gas flow is stabilised by the inlet channel even at high flow speeds in the constriction of the inlet channel.

This object is achieved by the features of the filter device described herein, and the advantageous development thereof. Embodiments of the filter device have an intake channel, which runs into the inlet channel upstream of an end of the inlet channel on the interior side and connects the inlet channel to the interior of the filter device.

Through the intake channel, which connects the inlet channel to the interior of the filter device, in particular to the filter element receiving area of the filter device, air can be aspirated out of the interior of the filter device into the inlet channel, as a result of which the inflow of the raw gas through the inlet channel is stabilised.

In this case, the air preferably flows into the inlet channel directed in the longitudinal direction of the intake channel.

Moreover, auxiliary material can be entrained out of the interior of the filter device, in particular from the boundary surfaces of the interior of the filter device, by the air aspirated through the intake channel and transported to boundary surfaces of the inlet channel. In this way, boundary surfaces of the inlet channel are coated with the auxiliary material and thus effectively protected from fouling with paint overspray.

Such an auxiliary material serves to be deposited as barrier layer on the surfaces of the at least one filter element of the filter device and on other boundary surfaces of the flow path of the raw gas flow laden with paint overspray in order to prevent these surfaces from sticking because of adhesion of the overspray particles. In addition, the auxiliary material serves to ensure that the filter cake on the filter element remains passable to flow and not blocked.

By periodic cleaning of the filter elements of the filter device, the mixture of auxiliary material and paint overspray passes from the filter elements into an auxiliary material receiving tank arranged below the filter elements, from which it can be sucked out, for example, to be fed to the painting installation for renewed use as auxiliary material.

In addition, the mixture of auxiliary material and paint overspray located in the auxiliary material receiving tank can be swirled by means of compressed air pulses from a compressed air lance to thus rise out of the auxiliary material receiving tank to the filter elements and be deposited there.

The flowable auxiliary material in particle form is also referred to as "precoat" material or filter auxiliary material.

It is preferably provided that the intake channel is delimited by two intake channel boundary walls, between which a gap is formed.

This gap preferably has an inside width, i.e. an extent transversely to the intake channel boundary walls, of at least 5 mm.

Moreover, the gap has an inside width of preferably approximately 50 mm at most.

The width of the gap, i.e. its extent perpendicular to the central flow direction of the air through the gap and parallel to the intake channel boundary walls, is preferably substantially as large as the extent of the inlet channel in this direction.

The inlet channel and the gap of the intake channel preferably extend over almost the entire width of the filter device.

The intake channel preferably extends over a length of at least approximately 20 mm, in particular at least approximately 30 mm, in the flow direction of the air through the intake channel. A particularly favourably oriented inflow of the air from the intake channel into the inlet channel is achieved as a result.

In a preferred configuration of the invention it is provided that the two intake channel boundary walls are oriented so that they are inclined relative to one another at an angle of less than 10°.

It is particularly favourable if the two intake channel boundary walls run substantially parallel to one another.

Moreover, to obtain a high flow speed in the inlet channel it is advantageous if the intake channel is delimited by a front intake channel boundary wall, which is inclined relative to a lower inlet channel boundary surface, which delimits the inlet channel to the bottom, by an angle of less than 10°.

It is particularly favourable if the front intake channel boundary wall and the lower inlet channel boundary surface run substantially parallel to one another.

The intake channel preferably runs upwards into the inlet channel.

In a preferred configuration of the invention the intake channel is delimited by an intake channel boundary wall, which forms a section of a channel boundary element, wherein besides the intake channel boundary wall the channel boundary element comprises a further section, which forms a boundary of the inlet channel.

The further section of the channel boundary element preferably forms an upper boundary of the inlet channel.

In addition, it can be provided that the further section of the channel boundary element, which forms a boundary of the inlet channel, is inclined less steeply relative to the horizontal than the section of the channel boundary element forming the intake channel boundary wall. As a result of this, the flow cross-section of the inlet channel is enlarged after the intake channel joins it and the speed of flow in this region of the inlet channel is thus reduced. This facilitates the deposition of auxiliary material, which is transported out of the interior of the filter device through the intake channel, on the channel boundary element and/or on a lower inlet channel boundary surface.

The front intake channel boundary wall and/or the lower inlet channel boundary surface are preferably inclined relative to the horizontal at an angle of at least approximately 50°, preferably at least approximately 55°, e.g. pproximately 60°. As a result of this steep inclination of the boundary surfaces of the inlet channel relative to the horizontal, the inlet channel is narrowed, the speed of flow of the raw gas in the inlet channel is increased and more auxiliary material is transported out of the auxiliary material receiving tank to the filter elements. The deposition process of the paint overspray on the filter elements is thus more robust.

The front intake channel boundary wall delimiting the intake channel and/or the rear intake channel boundary wall delimiting the intake channel is preferably configured to be impermeable without air passages, e.g. as a solid sheet.

The filter device according to the invention preferably comprises an auxiliary material receiving tank to receive an auxiliary material, which is added to the raw gas flow before the raw gas flow passes through the at last one filter element, wherein the auxiliary material receiving tank has a side wall, which is inclined to the vertical and to the horizontal and forms a lower boundary of the inlet channel.

The side wall of the auxiliary material receiving tank delimiting the inlet channel to the bottom preferably has an inclination relative to the horizontal of at least approximately 50°, in particular at least approximately 55°, e.g. approximately 60°.

To enable liquids passing out of an application region of the painting installation into the region of the filter device to pass into the interior of the filter device and in particular into the auxiliary material receiving tank, it is advantageous if the casing of the filter device comprises a front wall section, which is inclined relative to the vertical so that a lower edge of the front wall section projects into the outer area of the filter device.

In this case it can be provided in particular that the liquids passing onto the casing of the filter device drip over the lower edge of the front wall section into a trough arranged underneath it.

The feature of a casing with a front wall section inclined relative to the vertical is also advantageous in a filter device with the features of the preamble of claim 1 independently of the presence of an intake channel.

Therefore, the present description also relates to a filter device for separating paint overspray from a raw gas flow containing overspray particles, which comprises a casing, which delimits an interior of the filter device, in which at least one filter element is arranged, and at least one inlet channel, through which the raw gas flow enters the interior of the filter device, wherein the casing comprises a front wall section, which is inclined relative to the vertical such that a lower edge of the front wall section projects into the outer area of the filter device.

It is particularly favourable if the casing is provided with a drip edge, at which liquid flowing along a front wall section of the casing drips off the casing.

Such a drip edge can be arranged in particular on a drip element, e.g. on a drip plate, projecting from the front wall of the casing into the outer area of the filter device.

The filter device according to the invention is suitable in particular for use in a device for separating paint overspray from a raw gas flow containing overspray particles, which comprises at least one filter device according to the invention and a flow chamber, through which the raw gas flow flows from an application region of a painting installation to the inlet channel of the filter device.

To facilitate the maintenance of such a device, it is preferably provided that the device has a walkway, which is accessible for maintenance staff and has a tread surface.

Such an accessible walkway can additionally serve to deflect the raw gas flow inside the flow chamber in order to direct the raw gas flow to the inlet channel of the filter device or to the inlet channels of a plurality of filter devices.

To increase work safety and in particular to prevent maintenance staff from accidentally stepping into an adjacent filter device, it is advantageous if the accessible walkway additionally has at least one edge that is raised in relation to the tread surface.

The raised edge is arranged between the tread surface on one side and at least one filter device on the other side, and prevents persons from being able to slide into a hopper inlet of the adjacent filter device by slipping, stumbling or losing their footing in some other way and thus causing considerable injury to themselves.

The feature of an accessible walkway with an edge that is raised in relation to the tread surface is also advantageous independently of the presence of an intake channel on the at least one filter device.

Therefore, the present description also relates to a device for separating paint overspray from a raw gas flow containing overspray particles that comprises at least one filter device with a casing, which delimits an interior of the filter device, in which at least one filter element is arranged, and with at least one inlet channel, through which the raw gas flow enters the interior of the filter device, and a flow chamber, through which the raw gas flow flows from an application region of a painting installation to the inlet channel of the filter device, wherein the device comprises an accessible walkway, which has a tread surface at least one edge that is raised in relation to the tread surface.

It is particularly advantageous if the casing of the filter device has a drip edge, which is arranged vertically above the tread surface or above an inner edge face of the accessible walkway arranged between the tread surface and the raised edge. This enables liquids, which can pass out of the application region of the painting installation onto the casing of the filter device, pass over the drip edge onto the tread surface or the inner edge face of the accessible walkway and be prevented from flowing off into the filter device by the raised edge of the accessible walkway.

It is particularly favourable if the accessible walkway has a respective raised edge on both sides, so that the region of the accessible walkway delimited by these opposing raised edges forms a trough, which catches and retains liquids passing onto the accessible walkway from above.

The tread surface of the accessible walkway is preferably substantially plane and is preferably oriented substantially horizontally.

The raised edge of the accessible walkway preferably forms a separation edge for the flow of the raw gas through the inlet channel into the at least one filter device. As a result of forming a separation edge at the upper end of the inlet channel, a lower inlet channel boundary surface is covered with auxiliary material over its entire length. This surface is thus protected from fouling by paint overspray and it is not necessary to apply other protective materials to this surface.

Moreover, the inflowing air on the separation edge prevents auxiliary material from passing out of an auxiliary material receiving tank of the filter device into the flow chamber and from there into the application region of the painting installation.

To obtain a stable flow of the raw gas through the inlet channel at a high speed of flow, it is additionally favourable if an outer edge face of the accessible walkway arranged between the raised edge of the accessible walkway and an auxiliary material receiving tank of an adjacent filter device is inclined at an angle of less than 10° relative to a front wall section of the casing delimiting the inlet channel of the filter device to the top.

It is particularly favourable if the outer edge face of the accessible walkway and the front wall section of the casing delimiting the inlet channel to the top are oriented substantially parallel to one another.

The outer edge face of the accessible walkway and/or the front wall section of the casing delimiting the inlet channel to the top is/are inclined relative to the horizontal at an angle of at least approximately 50°, in particular at least approximately 55°, e.g. approximately 60°.

Moreover, it is advantageous for the generation of a stable raw gas flow through the inlet channel directed into the auxiliary material receiving tank if an outer edge face of the accessible walkway arranged between the raised edge of the accessible walkway and an auxiliary material receiving tank of the filter device is inclined at an angle of less than 10° relative to a side wall of the auxiliary material receiving tank delimiting the inlet channel to the bottom.

It is particularly favourable if the outer edge face of the accessible walkway and the side wall of the auxiliary material receiving tank delimiting the inlet channel to the bottom are oriented substantially parallel to one another.

The outer edge face of the accessible walkway and/or the side wall of the auxiliary material receiving tank delimiting the inlet channel to the bottom is inclined relative to the horizontal preferably at an angle of at least approximately 50°, in particular at least approximately 55°, e.g. approximately 60°.

In addition the present invention relates to a method for separating paint overspray from a raw gas flow containing overspray particles, which comprises the following method steps:

introducing the raw gas flow into an interior of a filter device through an inlet channel and     separating the paint overspray from the raw gas flow by means of at least one filter element arranged in the interior of the filter device.

A further object forming the basis of the present invention is to provide such a method, in which a stable inflow of the raw gas through the inlet channel is achieved even at high speed of flow.

This object is achieved according to the invention with a method with the features of the preamble of claim 15 in that the inlet channel is connected to the interior of the filter device by means of an intake channel, which runs into the inlet channel upstream of an end of the inlet channel on the interior side.

In this case, the maximum speed of flow of the raw gas flow in the inlet channel preferably amounts to at least approximately 7 m/s, in particular at least approximately 10 m/s.

Further advantageous configurations of the method for separating paint overspray from a raw gas flow containing overspray particles according to the invention have been explained above in association with the filter device according to the invention or in association with the device for separating paint overspray from a raw gas flow containing overspray particles according to the invention.

The filter device according to the invention and the device for separating paint overspray from a raw gas flow containing overspray particles according to the invention are suitable in particular for use in the method for separating paint overspray from a raw gas flow containing overspray particles according to the invention.

The filter device according to the invention, the separation device according to the invention and the method according to the invention enable the paint overspray, i.e. the paint that does not adhere to the workpieces to be painted, which is picked up and entrained in the form of overspray particles by an air flow passing through the application region of the painting installation, to be separated from the air flow again and the purified air flow to be fed again to the application region or discharged into the surrounding area of the installation.

In connection therewith, the paint overspray can be in particular fluid paint overspray.

In this description the term "fluid paint"—in contrast to the term "powder paint"—denotes a paint with a flowable consistency, from liquid to paste-like (e.g. in the case of a PVC paint). The term "fluid paint" encompasses in particular the terms "liquid paint" and "wet paint".

Further features and advantages of the invention are the subject of the following description and the graphical representation of an exemplary embodiment.

BRIEF DESCRIPTION OF THE DRAWINGS

Identical or functionally equivalent elements are given the same reference numerals in all the figures.

DETAILED DESCRIPTION OF THE INVENTION

An installation for spray painting vehicle bodies 102 that is shown in FIGS. 1 to 7 and given the overall reference 100 comprises a transport device 104, by means of which the vehicle bodies 102 can be moved in a transport direction 106 through an application region 108 of a painting booth given the overall reference 110.

The application region 108 is the interior of the painting booth 110, which is delimited on both sides of the transport device 104 by a respective booth wall 114 in a horizontal transverse direction 112 running perpendicularly to the transport direction 106, which corresponds to the longitudinal direction of the painting booth 110.

Spray painting devices 116, e.g. in the form of painting robots, are arranged in the painting booth 110 on both sides of the transport device 104.

Figure 2:
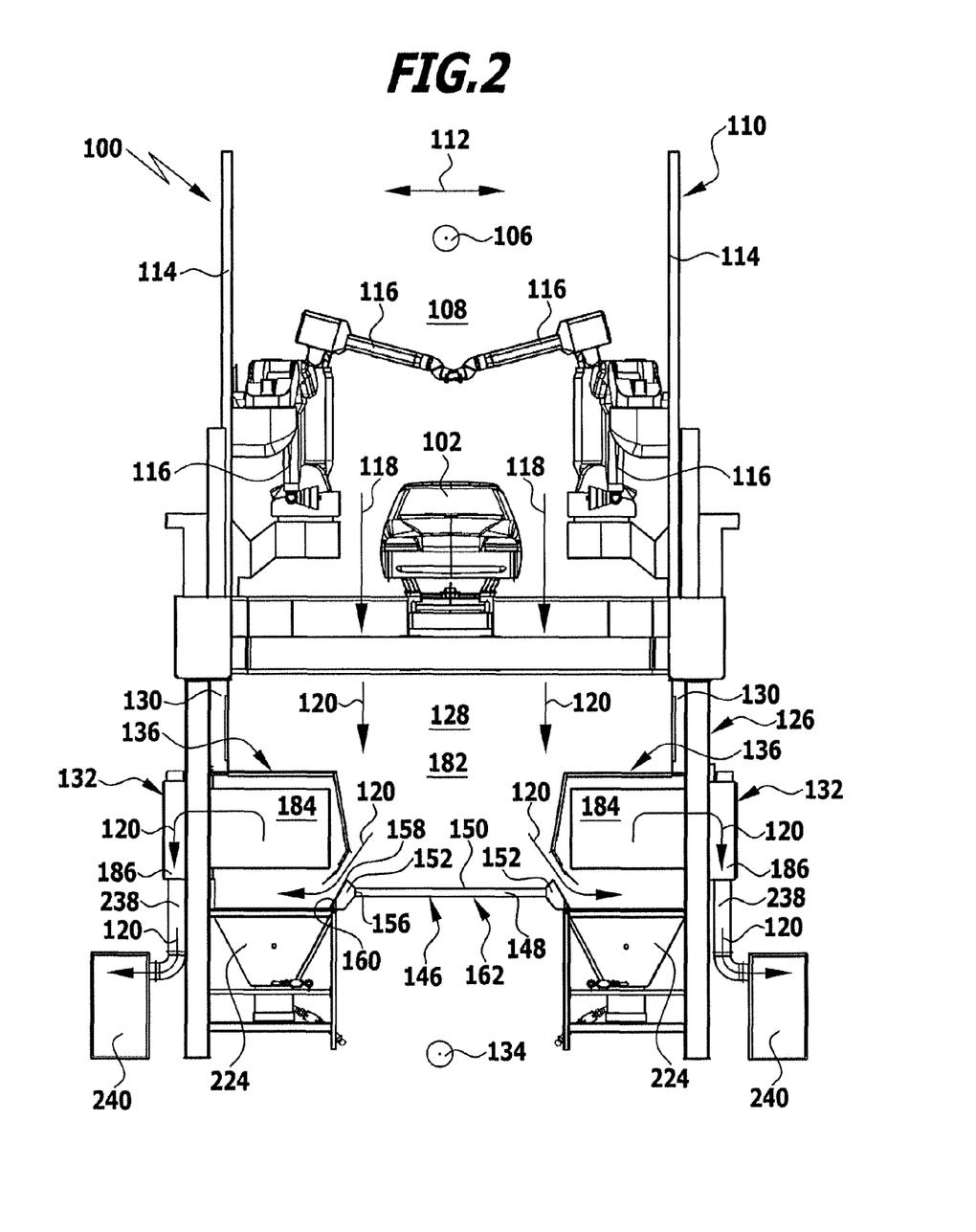
FIG. 2 is a schematic vertical cross-section through the installation from FIG. 1, wherein the respective flow direction of the raw gas and the exhaust air exiting from the filter modules are indicated by arrows.

An air flow, which passes through the application region 108 substantially vertically from the top downwards, as indicated in FIG. 2 by the arrows 118, is generated by means of a recirculated air circuit (only shown in sections).

This air flow picks up paint overspray in the form of overspray particles in the application region 108. The term "particle" in this case encompasses both solid and liquid particles, in particular droplets.

When using fluid paint the fluid paint overspray consists of paint droplets. Most of the overspray particles have a largest dimension in the range of approximately 1 μm to approximately 100 μm.

Figure 6:
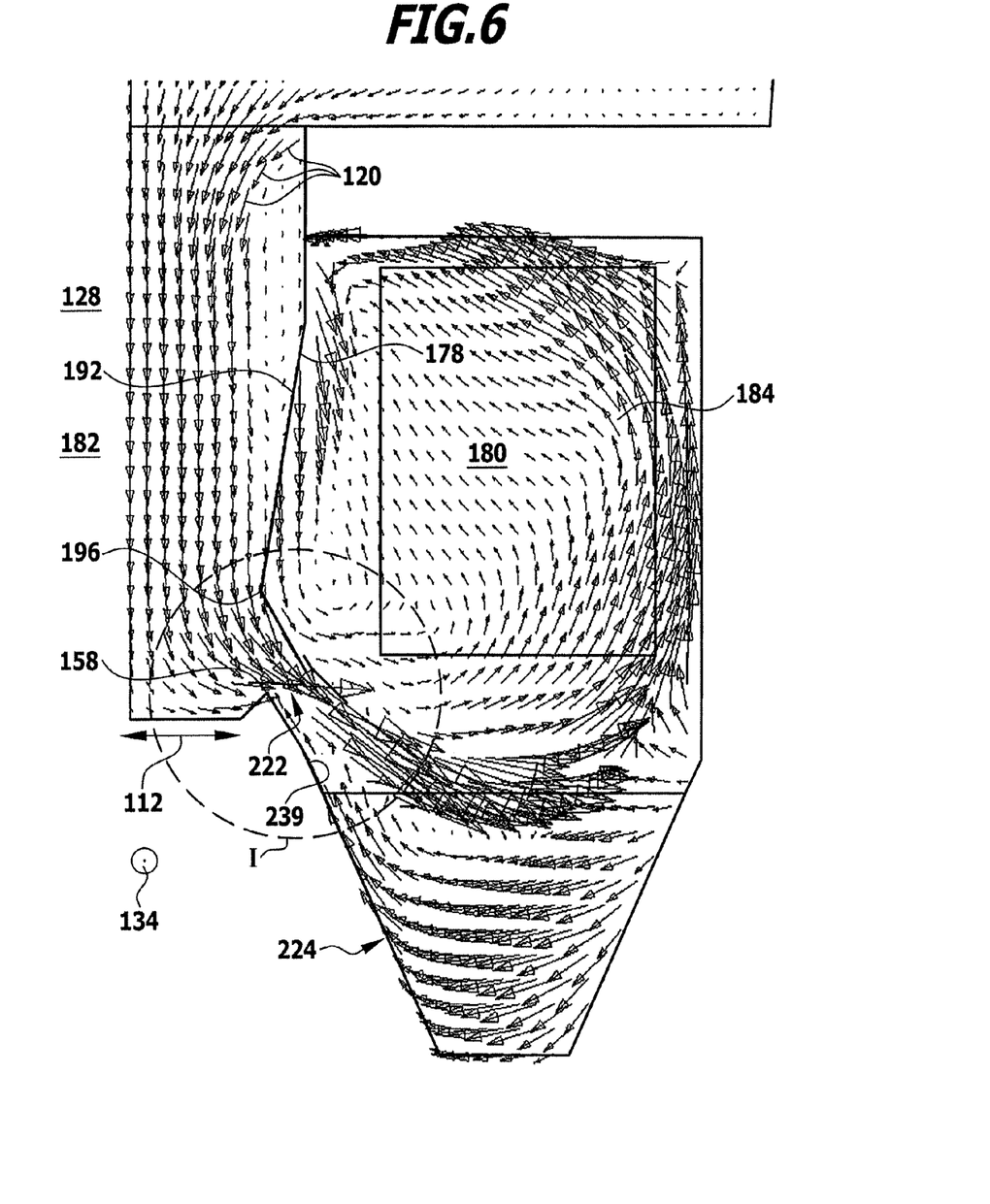
FIG. 6 is a schematic vertical cross-section through the filter module and the adjoining region of the flow chamber, in which the respective local flow direction of the raw gas flow is indicated by arrows.
Figure 7:
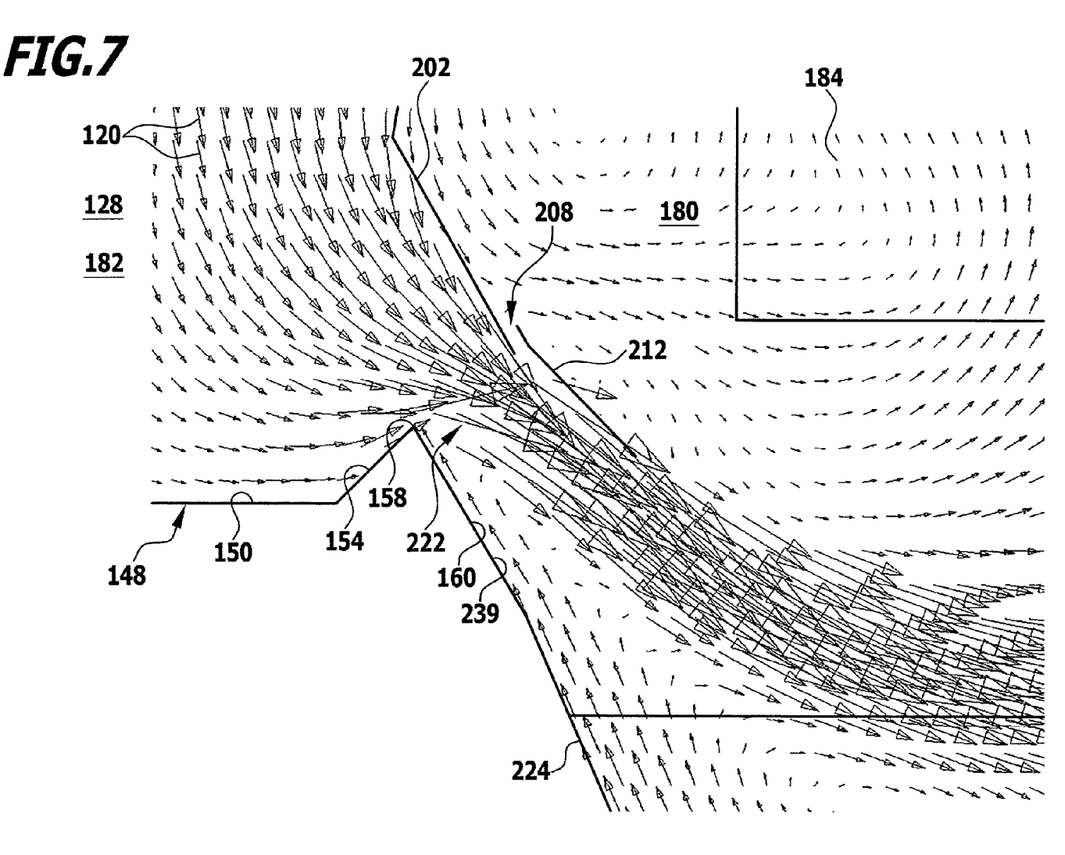
FIG. 7 is an enlarged representation of region I from FIG. 6, which represents the respective local flow direction of the raw gas flow in the region of an inlet channel of the filter module.

The exhaust air flow laden with the overspray particles from the application region 108 is referred to below as raw gas flow 120. The flow direction of the raw gas flow is represented in FIGS. 2, 6 and 7 by arrows given the reference 120.

The raw gas flow leaves the painting booth 110 downwards and passes into a device for separating fluid paint overspray form the raw gas flow, given the overall reference 126, which is arranged below the application region 108.

The device 126 comprises a flow chamber 128 that is substantially cuboidal, for example, which extends over the entire length of the painting booth 110 and beyond in the transport direction 106 and is delimited in the transverse direction 112 by vertical side walls 130 that are substantially in alignment with the booth side walls 114 of the painting booth 110, so that the flow chamber 128 has substantially the same horizontal cross-sectional area as the painting booth 110 and is arranged substantially completely within the vertical projection of the area of the painting booth 110.

Figure 1:
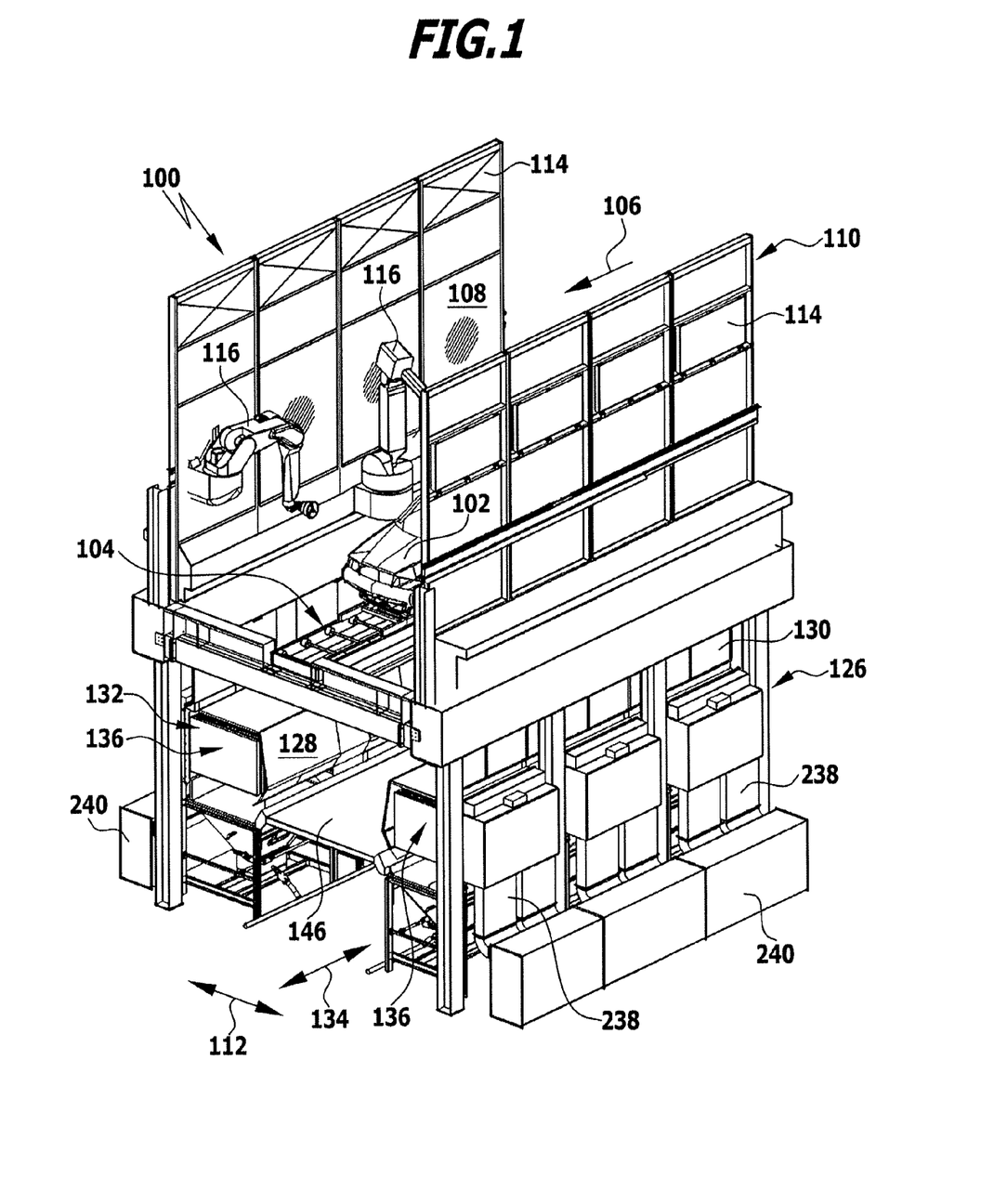
FIG. 1 is a schematic perspective representation of a painting booth with a device for separating paint overspray from a raw gas flow containing overspray particles arranged underneath it, said device comprising a flow chamber arranged under the painting booth and three respective filter modules on both sides of the flow chamber.

As can be seen from FIG. 1, a plurality of, e.g. three, filter modules 132 also referred to in the above description as filter devices are respectively arranged on both sides of the flow chamber 128 and form two module rows 136 extending in the longitudinal direction 134 of the device 126 for separating fluid paint overspray. In this case the longitudinal direction 134 of the device 126 corresponds to the transport direction 106.

As can be seen from FIGS. 1 and 2, a walkway 146 that is accessible for an operator is provided between the two module rows 136.

The walkway 146 has a central tread region 148 with a substantially horizontal tread surface 150 and two edge regions 152 running in the longitudinal direction 134 arranged on both sides of the tread region 148.

Each edge region 152 has an inner edge face 154, which is directed towards the tread surface 150, is inclined to the horizontal at an angle of approximately 20° to approximately 60°, for example, and rises from an outer edge 156 of the tread surface 150 up to an upper boundary edge 158, so that a raised edge 159 of the accessible walkway 146 is formed.

Moreover, each edge region 152 comprises an outer edge face 160, which is directed away from the tread surface 150 and drops downwards from the upper boundary edge 158, wherein the outer edge face 160 is preferably inclined more steeply relative to the horizontal than the inner edge face 154, e.g. at an angle of approximately 40° to approximately 80°.

Because the tread surface 150 of the walkway 146 is lowered in relation to the upper boundary edges 158 on both sides of the tread surface 150, the walkway 146 forms a trough 162 that can receive larger quantities of liquid, which can pass from the application region 108 into the device 126 for separating fluid paint overspray from the raw gas flow 120 during operation of the installation 100. This can occur in particular as a result of liquids being spilt in the painting booth 110, for example, if a bucket of solvent falls over.

Moreover, work safety is increased as a result of the trough 162 with the raised edges 159 in relation to the tread surface 150, since maintenance staff are prevented from sliding off the walkway 146 into one of the adjoining filter modules 132 by slipping, stumbling or losing their footing in some other way and thus causing considerable injury to themselves.

Each of the filter modules 132 is formed as a preassembled unit, which is produced at a location remote from the installation site of the painting installation 100 and is transported as a unit to the installation site of the painting installation. At the installation site the preassembled unit is arranged in the provided work position and is connected to one or more adjacent preassembled units and also to a support structure of the application region 108.

The structure of a filter module 132 is described below with reference to FIGS. 3 and 4:

The module comprises a support structure 164 composed of two vertical rear supports 166 and two vertical front supports 168, which are respectively connected to one of the rear supports 166 by means of horizontal cross members 170.

In addition, the front supports 168 are connected to one another at their upper ends by means of a horizontal cross member 172.

The rear supports 166 are also connected to one another at their upper ends by means of a horizontal cross member 174.

The lower horizontal cross members 170 are likewise connected to one another by means of cross members 176 running parallel to the longitudinal direction 134.

In addition, the filter module 132 comprises a casing 178, which separates an interior 180 of the filter module 132 arranged inside the casing 178 from a region 182 of the flow chamber 128 located outside the casing 178.

A plurality of filter elements 184, which project in horizontal direction from a common base body 186 held on the support structure 164, are arranged in the interior 180 or filter element receiving area of the filter module 132.

The filter elements 184 can be formed from plates of sintered polyethylene, for example, which are provided with a membrane of polytetrafluoroethylene (PTFE) on their outer surface.

The coating of PTFE serves to increase the filter class of the filter elements 184 (i.e. to reduce their permeability) and additionally to prevent the fluid paint overspray separated from the raw gas flow from adhering permanently to the surface of the filter elements 184.

The coating of the filter elements 184 additionally contains an electrically conductive component, e.g. graphite, to assure a discharge of electrostatic charges from the filter elements 184 and antistatic properties of the filter elements 184.

Both the basic material of the filter elements 184 and their PTFE coating have a porosity, so that the raw gas can pass through the pores into the interior of the respective filter element 184.

To prevent sticking of the filter surfaces, these are additionally provided with a barrier layer composed of auxiliary material released into the raw gas flow. This auxiliary material preferably in particle form is usually also referred to as "precoat" material.

The barrier layer is formed during operation of the device 126 by deposition of the auxiliary material released into the raw gas flow 120 on the filter surfaces and prevents the filter surfaces from sticking as a result of adherent fluid paint overspray.

Auxiliary material from the raw gas flow 120 is also deposited on the inside surfaces of the casing 178 of the filter module 132, where it also prevents adhesion of fluid paint overspray.

In principle, any material capable of absorbing the liquid component of the fluid paint overspray and being deposited on overspray particles and thus take the stickiness therefrom can be used as auxiliary material.

In particular, lime, rock meal, aluminium silicate, aluminium oxide, silicon oxide, powder paint or similar are conceivable as auxiliary materials.

Alternatively or additionally hereto, particles with a hollow structure and large inside surface relative to their external dimensions, e.g. zeolites or other hollow e.g. spherical bodies composed of polymers, glass or aluminium silicate and/or naturally or synthetically produced fibres, can also be used as auxiliary material for absorbing and/or binding the overspray.

Alternatively or additionally hereto, particles that react chemically with the overspray, e.g. chemically reactive particles from amine, epoxide, carboxyl, hydroxyl or isocyanate groups, chemically reactive particles of aluminium oxide post-treated with octylsilane or solid or liquid mono-, oligo- or polymers, silanes, silanols or siloxanes, can also be used as auxiliary material for absorbing and/or binding the overspray.

A waste product from a production process can also be used as auxiliary material, e.g. a waste product from powder paint processing or a wood dust or metal dust from wood or metal processing.

The auxiliary material is preferably composed of a plurality of auxiliary material particles, which have an average diameter in the range of e.g. approximately 10 μm to approximately 100 μm.

Figure 3:
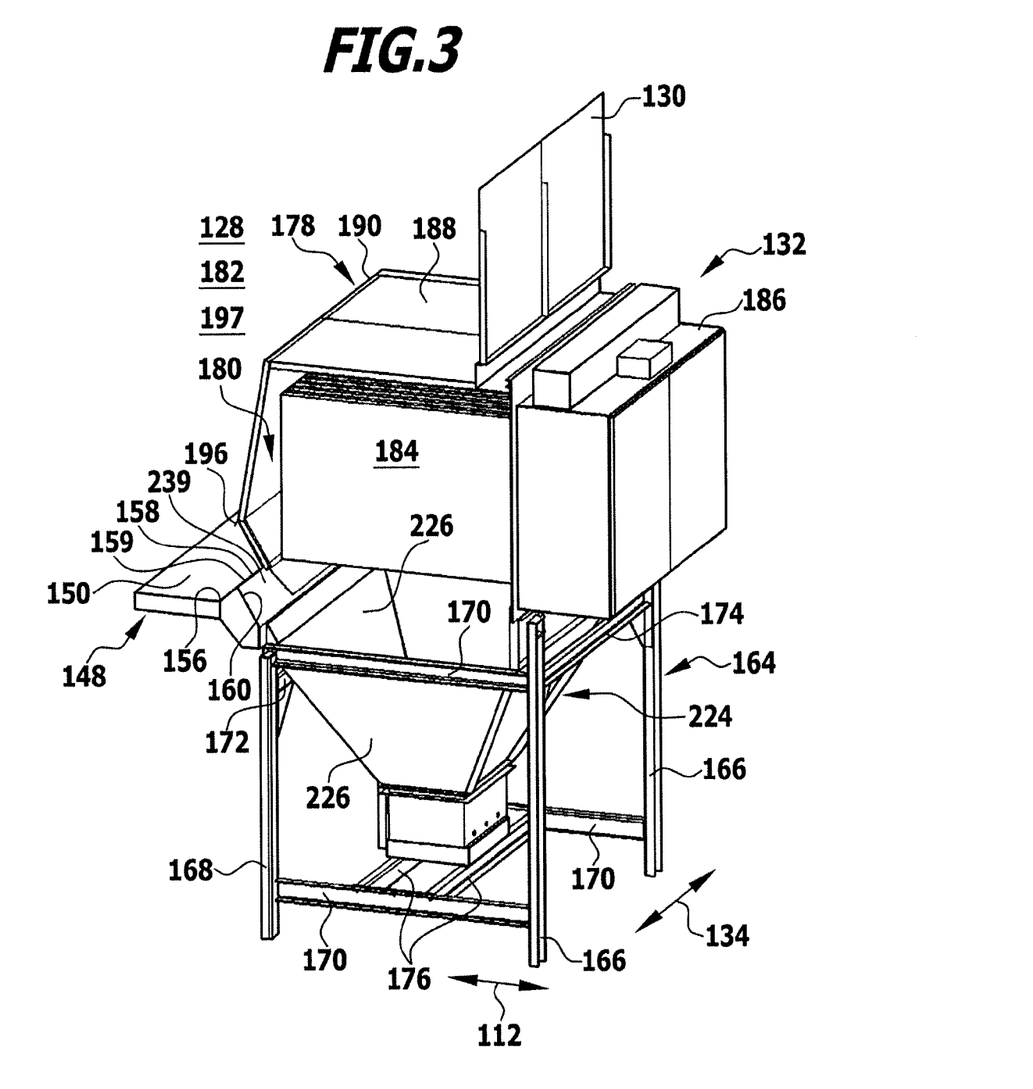
FIG. 3 is a schematic perspective representation of an individual filter module.
Figure 4:
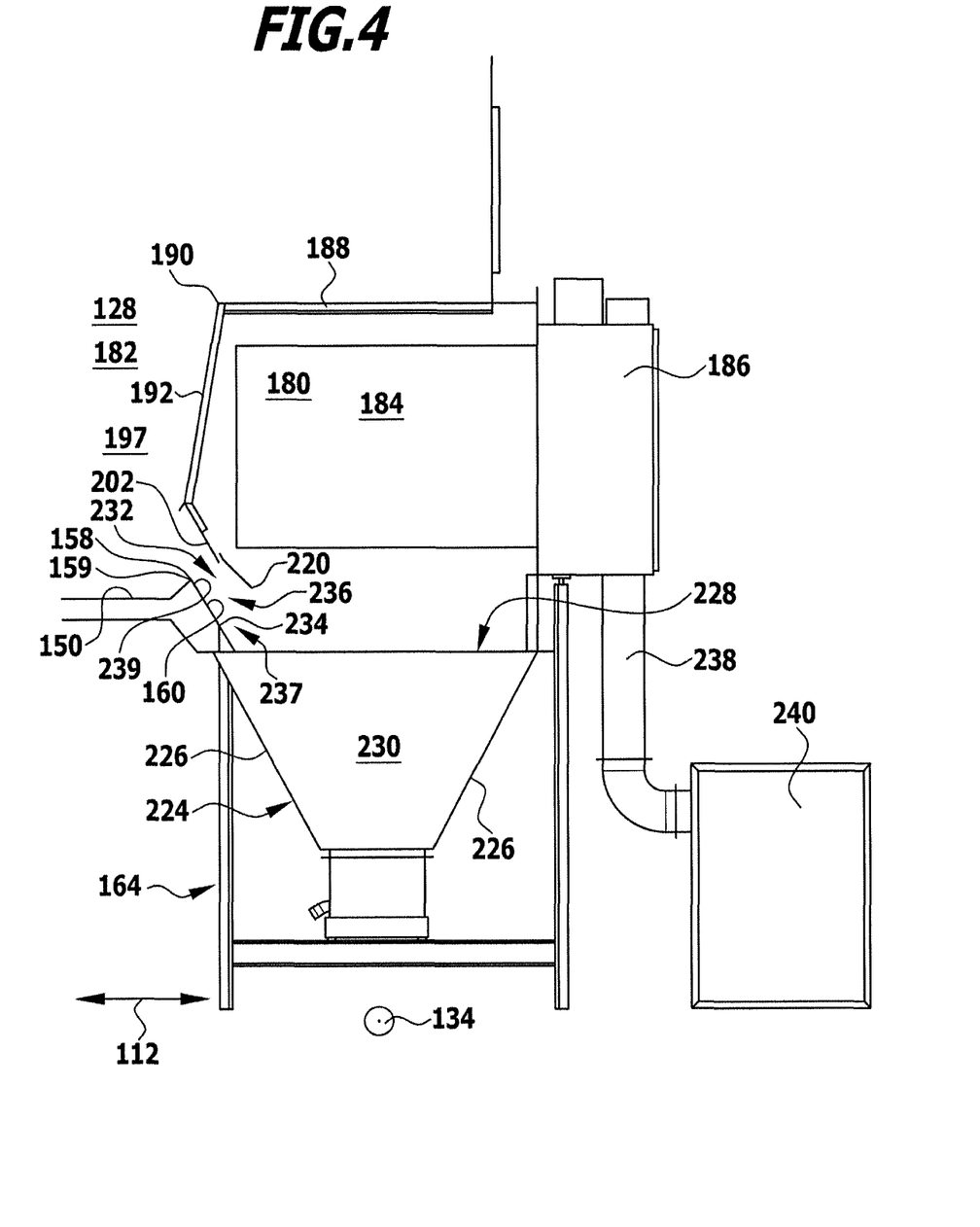
FIG. 4 is a schematic vertical cross-section through the filter module from FIG. 3.
Figure 5:
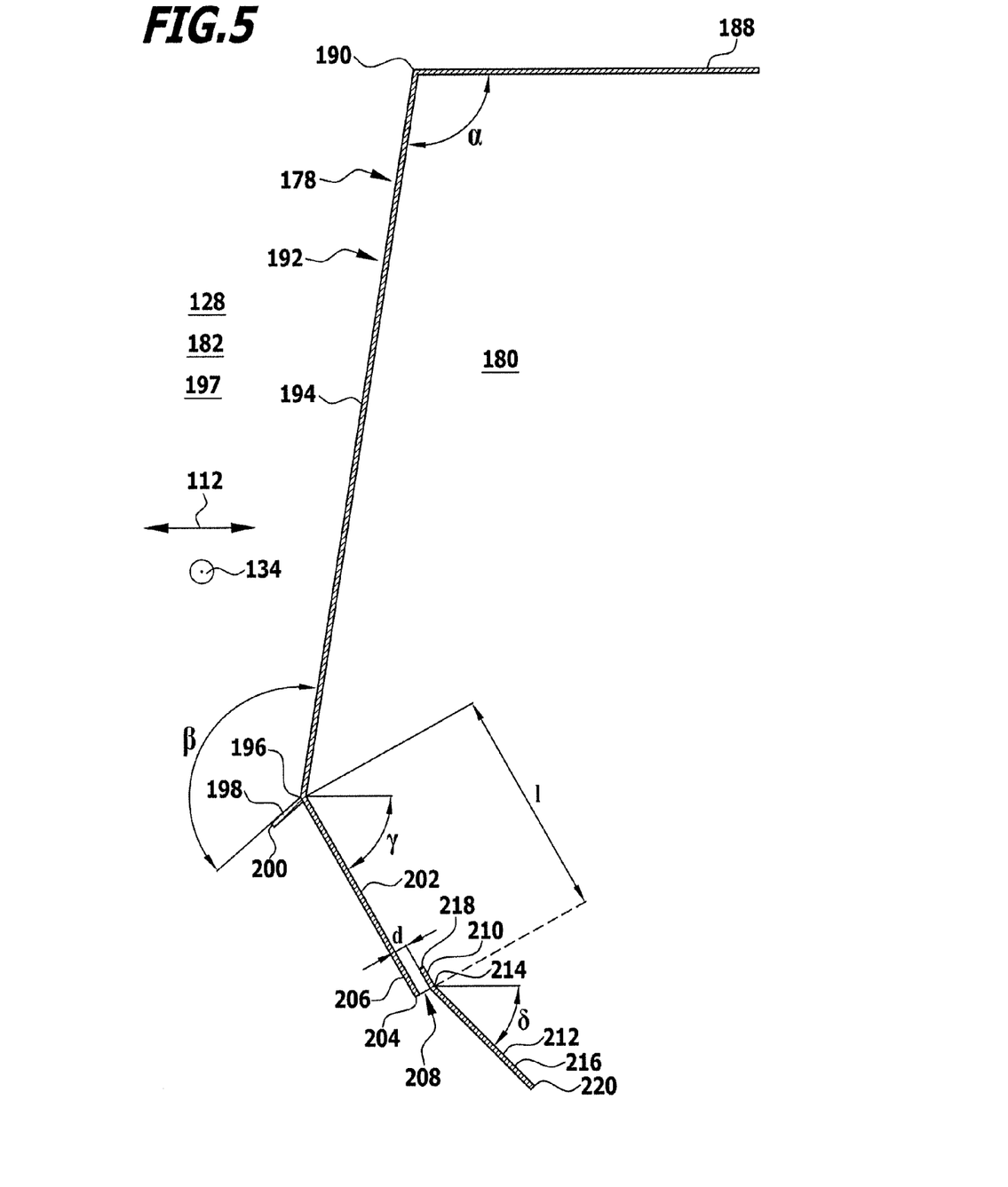
FIG. 5 is a schematic vertical section through a front wall of a casing of the filter module from FIGS. 3 and 4.

As can be seen from FIGS. 3 to 5, the casing 178 comprises a substantially horizontal ceiling wall 188 and a front wall 192 extending downwards from a front edge 190 of the ceiling wall 188.

The front wall 192 of the casing 178 comprises an upper front wall section 194, which extends from the front edge 190 of the ceiling wall 188 to a front edge 196 of the front wall 192.

The upper front wall section 194 encloses an obtuse angle a of more than 90° to approximately 110°, e.g. of approximately 100°, with the horizontal, so that with the front edge 196 the upper front wall section 194 projects outwards away from the filter elements 184 and the base body 186 thereof into the region 182 of the flow chamber 128 in the outside area 197 of the filter module 132, so that the interior 180 of the filter module 132 available for receiving the filter modules 184 is enlarged as a result of this structure of the casing 178.

A drip element 198 projects even further into the outside area 197 of the filter module 132 from the region of the front edge 196.

The drip element 198 can be configured as a drip plate, for example.

The drip element 198 encloses an obtuse angle 13 with the outer surface of the upper front wall section 194 and terminates at a drip edge 200.

The drip edge 200 is preferably arranged vertically above the tread surface 150 or, as shown in FIG. 4, vertically above the inner edge face 154 of the edge region 152 of the accessible walkway 146, so that liquids dripping from the drip edge 200 are collected in the trough 162 of the accessible walkway 146.

The drip element 198 with the drip edge 200 ensures that liquids flowing along the sloping upper front wall section 194 drip off the casing 178 and flow into the trough 162 instead of flowing along the outer contour of the casing 178 and being entrained into the interior 180 of the filter module 132 by the air flow.

The front wall 192 of the casing 178 additionally comprises a lower front wall section 202, which extends downwards from the front edge 196 to a lower front wall edge 204.

The lower front wall section 202 is inclined to the horizontal at an acute angle y of e.g. approximately 40° to approximately 80°, in particular approximately 60°, i.e. so that the lower front wall edge 204 lies closer to the filter elements 184 and their base body 186 than the front edge 196.

The lower front wall section 202 has a length l of e.g. approximately 20 cm to approximately 40 cm, preferably approximately 30 cm.

The lower end of the lower front wall section 202 forms a front intake channel boundary wall 206 of an intake channel 208, which is delimited on the other side by a rear intake channel boundary wall 210, which is arranged at a distance d of e.g. approximately 5 mm to approximately 50 mm from the front intake channel boundary wall 206 and is oriented substantially parallel thereto.

The rear intake channel boundary wall 210 forms an upper section of a channel boundary element 212 and at a bending line 214 adjoins a lower section of the channel boundary element 212, which is inclined to the horizontal at an angle a, wherein angle a is smaller than angle y, at which the rear intake channel boundary wall 210 and the front intake channel boundary wall 206 are inclined relative to the horizontal.

The extent of the rear intake channel boundary wall 210 from its upper edge 216 to the bending line 214 preferably amounts to approximately 2 cm to approximately 4 cm, in particular approximately 3 cm. This extent corresponds to the length of the intake channel 208 in the longitudinal direction or throughflow direction thereof.

The extent of the lower section 216 of the channel boundary element 212 from the bending line 214 to a lower edge 220 of the channel boundary element 212 preferably amounts to approximately 10 cm to approximately 30 cm, in particular approximately 20 cm.

The lower front wall section 202 and the channel boundary element 212 are preferably formed as solid sheets without passages.

The intake channel 208 extends in the longitudinal direction 134 of the device 126 over substantially the entire length of the filter module 132.

The intake channel 208 forms a fluid connection between the interior 180 of the casing 178 of the filter module 132 and an inlet channel 222 of the filter module 132 delimited to the top by the lower front wall section 202 and the channel boundary element 212.

In this case, the intake channel 208 runs into the inlet channel 222 upstream of the end of the inlet channel 222 on the interior side.

To be able to feed the auxiliary material to the raw gas flow without any risk of the auxiliary material passing into the application region 108 of the painting installation 100, each filter module 132 is provided with an auxiliary material receiving tank 224, which is held on the support structure 164 and, for example, has a funnel-like structure in the form of an inverted truncated pyramid (see FIGS. 3 and 4).

The four trapezoidal side walls 226 of the auxiliary material receiving tank 224 are inclined relative to the vertical at an angle of preferably approximately 40° to approximately 80°, in particular approximately 60°.

The height of the auxiliary material receiving tank 224 amounts to approximately 1.1 m, for example.

The upper edges of the side walls 226 enclose an access opening 228 of the auxiliary material receiving tank 224, through which the raw gas flow 120 laden with overspray can enter the auxiliary material receiving tank 224 and escape therefrom again.

To direct the raw gas flow entering the filter module 132 specifically into the interior 230 of the auxiliary material receiving tank 224 and prevent direct access of the raw gas flow from the flow chamber 128 to the filter elements 184, each filter module 132 is provided with the inlet channel 222, which extends from an inlet 232 formed between the lower front wall section 202 of the casing 178 of the filter module 132 and the outer edge face 160 of the accessible walkway 146 to an outlet 236 formed between the lower edge 220 of the channel boundary element 212 and the lower edge 234 of the outer edge face 160 of the walkway 146.

The outlet 236 forms an end 237 of the inlet channel 222 on the interior side.

The intake channel 208 runs from above into the inlet channel 222 upstream of the outlet 236.

The inlet channel 222 is delimited at the top by the lower front wall section 202 of the casing 178 and by the channel boundary element 212 and below by the outer edge face 160 and the side wall 226 of the auxiliary material receiving tank 224 connected at the bottom.

The inlet channel 222 extends over substantially the entire length of the filter module 132 in the longitudinal direction 134.

The outer edge face 160 of the accessible walkway 146 forms a lower inlet channel boundary surface 239.

The outer edge face 160 of the accessible walkway 146, the side wall 226 of the auxiliary material receiving tank 224 connecting downwards to this outer edge face 160 and the lower front wall section 202 of the casing 178 are substantially at the same inclination to the horizontal, preferably in the range of approximately 50° to approximately 70°, in particular from approximately 55° to approximately 65°, e.g. approximately 60°, as a result of which the inlet channel 222 has a narrowed entry section, which increases the speed of flow out of the flow chamber 128 into the filter module 132.

Thus, this speed of flow in the narrowest location of the inlet channel 222 amounts to more than 8 m/s, preferably at least 10 m/s.

Because of this high entry speed of flow of the raw gas flow into the filter module 132, the flow through the auxiliary material receiving tank 224 into the interior 180 of the filter module 132 is stabilised.

Moreover, as a result of the increase in the speed of flow more auxiliary material is swirled up out of the auxiliary material receiving tank 224 and taken up by the raw gas flow and thus transported to the filter elements 184.

Auxiliary material from the interior 180 of the casing 178 lying in particular on the inside of the lower front wall section 202 is sucked through the intake channel 208 out of the interior 180 of the casing 178 into the inlet channel 222. The auxiliary material sucked into the inlet channel 222 passes onto the outer surface of the channel boundary element 212 delimiting the inlet channel 222 and/or onto the lower inlet channel boundary surface 239, as a result of which these surfaces are effectively protected from fouling by paint overspray.

As a result of the lower section 216 of the channel boundary element 212 being inclined less steeply relative to the horizontal than the rear intake channel boundary wall 210 and the lower front wall section 202 of the casing 178, the flow cross-section of the inlet channel 222 is increased and the speed of the raw gas flow through the inlet channel 222 is reduced.

As a result of this configuration of the inlet channel 222 the formation of blobs of paint is effectively prevented. Rather, the paint overspray is aspirated into the auxiliary material receiving tank 224 exclusively in the form of fine paint droplets.

Moreover, the channel boundary element 212 acts as a deflection element, which prevents material cleaned off from the filter elements 184 that contains auxiliary material and overspray particles bonded to the auxiliary material from passing directly into the inlet channel 222.

Rather, material falling from the filter elements 184 onto the upper side of the channel boundary element 212 is directed into the auxiliary material receiving tank 224 by the sloping position of the channel boundary element 212.

During operation of the filter module 132 both the lower surface and the upper surface of the channel boundary element 212 are provided with a coating of the auxiliary material, so that these faces of the channel boundary element 212 are easy to clean and no overspray adheres directly to the channel boundary element 212.

The upper boundary edge 158 of the walkway 146 forms a separation edge for the raw gas flow, as a result of which substantially no raw gas passes back up beyond the separation edge into the flow chamber 128 from the auxiliary material receiving tank 224.

This additionally results in the outer edge face 160, which forms a feed slope for the filter module 132, being covered with auxiliary material on its entire length. As a result, this surface is protected from fouling by paint overspray, and it is not necessary to apply other protective materials to this surface.

At the same time, auxiliary material is prevented by the inflowing air at the separation edge from passing out of the auxiliary material receiving tank 224 into the flow chamber 128 and from there into the application region 108 of the painting booth 110.

The high speed of flow of the raw gas flow in the constriction of the inlet channel 222 (approximately at the location where the intake channel 208 runs into the inlet channel 222) effectively prevents auxiliary material from passing out of the inside of the filter module 132, which forms a closed box, into the flow chamber 128 and from there into the application region 108. Therefore, swirling of the auxiliary material in the auxiliary material receiving tank 224 and cleaning of the filter elements 184 can occur at any desired time without the supply of raw gas to the filter module 132 or even the operation of the spray painting devices 116 in the application region 108 having to be interrupted.

In addition, because the raw gas flow directed into the auxiliary material receiving tank 224 exits from the inlet channel 222, it is assured that a deflection of the raw gas flow occurs in the interior 230 of the auxiliary material receiving tank 224. As a result, a sufficient amount of auxiliary material, which is generated by the swirling up out of the reserve located in the auxiliary material receiving tank 224, is entrained by the raw gas flow. In addition, auxiliary material swirled by means of a swirling device (not shown) in the interior 230 of the auxiliary material receiving tank 224 is carried out of the auxiliary material receiving tank 224 to the filter elements 184 by the raw gas flow 120.

The raw gas flow out of the flow chamber 128 through the inlet channel 222 into the interior 180 of the filter module 132 is shown in FIGS. 6 and 7 as a result of a flow simulation. It can be clearly seen from this that a current eddy is formed in the interior of the filter module 132, by means of which the raw gas is firstly directed into the auxiliary material receiving tank 224 and then from there, laden with additional auxiliary material, to the filter elements 184.

The auxiliary material entrained by the raw gas flow 120 and the fluid paint overspray entrained by the raw gas flow 120 are deposited on the filter surfaces of the filter elements 184, and the filtered raw gas passes as exhaust air flow through the porous filter surfaces into the interiors of the filter elements 184, which are connected to a cavity inside the base body 186, from which the filter elements 184 project.

From this cavity, the purified exhaust air flow passes into one or more respective exhaust air pipes 238, which lead from the base body 186 of the filter elements 184 of each filter module 132 to an exhaust air duct 240, which is arranged outside the flow chamber 128 and runs parallel to the longitudinal direction 134 of the flow chamber 128 (see FIGS. 1 and 4).

From the exhaust air ducts 240 arranged on both sides of the flow chamber 128, the purified exhaust air free of the fluid paint overspray passes to an exhaust air fan (not shown), and from there the purified exhaust air is fed by means of a cooling battery (not shown) and a feed pipe (not shown) to an air chamber (not shown), the so-called plenum, arranged outside the application region 108.

From this air chamber the purified exhaust air passes back into the application region 108 through a filter cover, as a result of which the recirculated air circuit is closed by the painting booth 110.

Since the separation of the fluid paint overspray from the raw gas flow 120 by means of the filter elements 184 is a dry operation, i.e. occurs without washing with a cleaning liquid, the air guided in the recirculated air circuit is not moistened during the separation of the fluid paint overspray, and therefore no devices for dehumidifying the air guided in the recirculated air circuit are necessary at all.

Moreover, no devices for separating fluid paint overspray from a cleaning liquid used for washing are necessary either.

The filter elements 184 are cleaned by compressed air pulses at specific time intervals when they are laden with fluid paint overspray and auxiliary material to a predetermined extent.

The necessary compressed air pulses are generated by means of a pulsing unit arranged on the base body 186 of the filter elements 184 of each filter module 132. The generated compressed air pulses pass from the interiors of the filter elements 184 through the porous filter surfaces into the interior 180 of the filter module 132, wherein the barrier layer formed on the filter surfaces from auxiliary material and the fluid paint overspray deposited thereon is detached from the filter surfaces, so that the filter surfaces are brought back to their cleaned original state.

The cleaned off mixture of auxiliary material and fluid paint overspray drops down into the auxiliary material receiving tank 224, from which it passes into the raw gas flow and is carried by this to the filter elements 184 again.

When the proportion of paint overspray in the mixture in the auxiliary material receiving tank 224 has reached an upper threshold, the mixture of auxiliary material and paint overspray is sucked out of the auxiliary material receiving tank 224 and replaced by fresh auxiliary material.

The invention claimed is:

1. Filter device for separating paint overspray from a raw gas flow containing overspray particles,
comprising a casing, which delimits an interior of the filter device, in which at least one filter element is arranged, and
at least one inlet channel extending from an inlet of the inlet channel to an outlet of the inlet channel, through which inlet channel the raw gas flow enters the interior of the filter device,
wherein the filter device has an intake channel, which runs into the inlet channel upstream of the outlet of the inlet channel and connects the inlet channel to the interior of the filter device.

2. Filter device according to claim 1, wherein the intake channel is delimited by two intake channel boundary walls, between which a gap is formed.

3. Filter device according to claim 2, wherein the two intake channel boundary walls are oriented such that they are inclined relative to one another at an angle of less than 10°.

4. Filter device according to claim 1, wherein the intake channel is delimited by a front intake channel boundary wall, which is inclined relative to a lower intake channel boundary wall at an angle of less than 10°.

5. Filter device according to claim 1, wherein the intake channel is delimited by an intake channel boundary wall, which forms a section of a channel boundary element, wherein the channel boundary element comprises a further section, which forms a boundary of the inlet channel.

6. Filter device according to claim 5, wherein the further section of the channel boundary element is inclined less steeply relative to the horizontal than the section of the channel boundary element forming the intake channel boundary wall.

7. Filter device according to claim 1, wherein the filter device comprises an auxiliary material receiving tank to receive an auxiliary material, which is added to the raw gas flow before the raw gas flow passes through the at least one filter element, wherein the auxiliary material receiving tank has a side wall, which is inclined to the vertical and to the horizontal and forms a lower boundary of the inlet channel.

8. Filter device according to claim 1, wherein the casing comprises a front wall section, which is inclined relative to the vertical such that a lower edge of the front wall section projects into the outer area of the filter device.

9. Filter device according to claim 1, wherein the casing is provided with a drip edge, at which liquid flowing along a front wall section of the casing drips off the casing.

10. Device for separating paint overspray from a raw gas flow containing overspray particles, comprising
at least one filter device for separating paint overspray from a raw gas flow containing overspray particles,
the filter device comprising
a casing, which delimits an interior of the filter device, in which at least one filter element is arranged, and
at least one inlet channel extending from an inlet of the inlet channel to an outlet of the inlet channel, through which inlet channel the raw gas flow enters the interior of the filter device,
wherein the filter device has an intake channel, which runs into the inlet channel upstream of the outlet of the inlet channel and connects the inlet channel to the interior of the filter device,
and a flow chamber, through which the raw gas flow flows from an application region of a painting installation to the inlet channel of the filter device.

11. Device according to claim 10, wherein the device comprises an accessible walkway, which has a tread surface at least one edge that is raised in relation to the tread surface.

12. Device according to claim 11, wherein the casing of the filter device has a drip edge, which is arranged vertically above the tread surface or above an inner edge face of the accessible walkway arranged between the tread surface and the raised edge.

13. Device according to claim 11, wherein the raised edge of the accessible walkway forms a separation edge for the flow of the raw gas through the inlet channel.

14. Device according to claim 11, wherein an outer edge face of the accessible walkway arranged between the raised edge and an auxiliary material receiving tank of the filter device is inclined at an angle of less than 10° relative to a front wall section of the casing delimiting the inlet channel to the top.

15. Method for separating paint overspray from a raw gas flow containing overspray particles, comprising the following method steps:
- introducing the raw gas flow into an interior of a filter device through an inlet channel extending from an inlet of the inlet channel to an outlet of the inlet channel and
- separating the paint overspray from the raw gas flow by means of at least one filter element arranged in the interior of the filter device,
- wherein the inlet channel is connected to the interior of the filter device by means of an intake channel, which runs into the inlet channel upstream of the outlet of the inlet channel.

* * * * *